United States Patent [19]

Poehlman

[11]  4,395,992

[45]  Aug. 2, 1983

[54] GASEOUS FUEL AND AIR PROPORTIONING DEVICE

[75] Inventor: Arthur G. Poehlman, West Bend, Wis.

[73] Assignee: Outboard Marine Corporation, Waukegan, Ill.

[21] Appl. No.: 314,226

[22] Filed: Oct. 23, 1981

[51] Int. Cl.³ .............................................. F02B 43/00
[52] U.S. Cl. .................................... 123/527; 123/525; 48/180 R; 48/180 C; 48/184
[58] Field of Search ....................... 123/527, 526, 525; 261/16, DIG. 67; 48/180 R, 180 PC, 184

[56] References Cited

U.S. PATENT DOCUMENTS

| 2,927,848 | 3/1960 | Baverstock | 48/184 |
| 3,081,160 | 3/1963 | Ensign | 48/184 |
| 3,650,255 | 3/1972 | McJones | 123/527 |
| 4,063,905 | 12/1977 | Johnson et al. | 123/527 |
| 4,280,968 | 7/1981 | Smeets | 48/180 C |
| 4,308,843 | 1/1982 | Garretson | 123/527 |

Primary Examiner—Charles J. Myhre
Assistant Examiner—E. Rollins Cross
Attorney, Agent, or Firm—Michael, Best & Friedrich

[57]  ABSTRACT

The device for proportioning a gaseous fuel and air for combustion in an internal combustion engine includes a plate-like first member having a peripheral edge portion and a second member cooperating with the first member to define a mixing chamber having an outlet adapted to be connected in communication with the air intake of the engine carburetor. The second member also includes an annular portion having an arcuate first wall which is convex to and spaced from the peripheral edge portion of the first member to define an annular venturi having an inlet in communication with the atmosphere and an annular outlet in communication with the mixing chamber. A base member or second wall cooperates with the arcuate wall to form a substantially closed, annular plenum chamber into which a gaseous fuel, such as natural gas, is admitted when the engine is to be operated on the gaseous fuel. The gaseous fuel is induced into the mixing chamber through one or more openings in the arcuate wall at or in the vicinity of the throat of the annular venturi. The proportioning device preferably is arranged to fit inside the housing of an existing air cleaner.

4 Claims, 3 Drawing Figures

GASEOUS FUEL AND AIR PROPORTIONING DEVICE

BACKGROUND OF THE INVENTION

This invention relates to devices for proportioning a gaseous fuel and air for combustion in an internal combustion engine. In one aspect, the invention relates to such devices which can be mounted on the air intake of the existing carburetor of an internal combustion engine to provide the engine with the capability of being operated on either a liquid fuel or a gaseous fuel.

Systems for providing internal combustion engines with the capability of operating on either liquid fuel, such as gasoline, or a gaseous fuel, such as natural gas, typically include a so-called gas mixer which fits onto the air intake of the existing carburetor and proportions the gaseous fuel and air in the proper ratio for combustion. Some prior gas mixers are so large that the existing air cleaner and/or manifold heating system must be removed with resultant warm-up problems when the engine is operated on gasoline. Other gas mixers restrict air flow and require some mechanical means for selectively increasing the air flow area when the engine is operated on gasoline.

SUMMARY OF THE INVENTION

The invention provides a device for proportioning a gaseous fuel and air for an internal combustion engine, which device includes a first member having a peripheral edge portion and a second member cooperating with the first member to define a mixing chamber having an outlet adapted to be connected in communication with the internal combustion engine. The second member includes an annular portion having an arcuate first wall which is convex to and spaced from the peripheral edge portion of the first member to define therebetween an annular venturi having an annular inlet in communication with the atmosphere, an annular outlet in communication with the mixing chamber and an intermediate annular throat of reduced cross sectional area. The second member further includes a second wall cooperating with the first wall to define a substantially closed, annular plenum chamber. The device further includes means for selectively admitting a gaseous fuel into the plenum chamber and means for inducing flow of the gaseous fuel from the plenum chamber into the mixing chamber.

In one embodiment, the means for inducing flow of gaseous fuel into the mixing chamber includes one or more openings in the first wall at or in the vicinity of the annular venturi throat.

In another embodiment, the openings are formed by a portion of the first wall at or in the vicinity of the annular venturi throat being offset toward the first member to define an area of minimum spacing between the first wall and the first member and to define an outlet port facing the venturi outlet.

In a preferred embodiment, the mixing device is adapted to fit inside the housing of an existing air cleaner.

One of the principal features of the invention is to provide a compact device for proportioning a gaseous fuel and air for combustion in an internal combustion engine, which device can be mounted inside the housing of an existing air cleaner to provide the engine with the capability of being operated on either a liquid fuel or a gaseous fuel.

Another of the principal features of the invention is to provide such a proportioning device which does not require means for increasing the air flow area when operation of the engine is switched from a gaseous fuel to a liquid fuel.

Other features, aspects and advantages of the invention will become apparent to those skilled in the art upon reviewing the following detailed description, the drawing and the appended claims.

Figure 1:
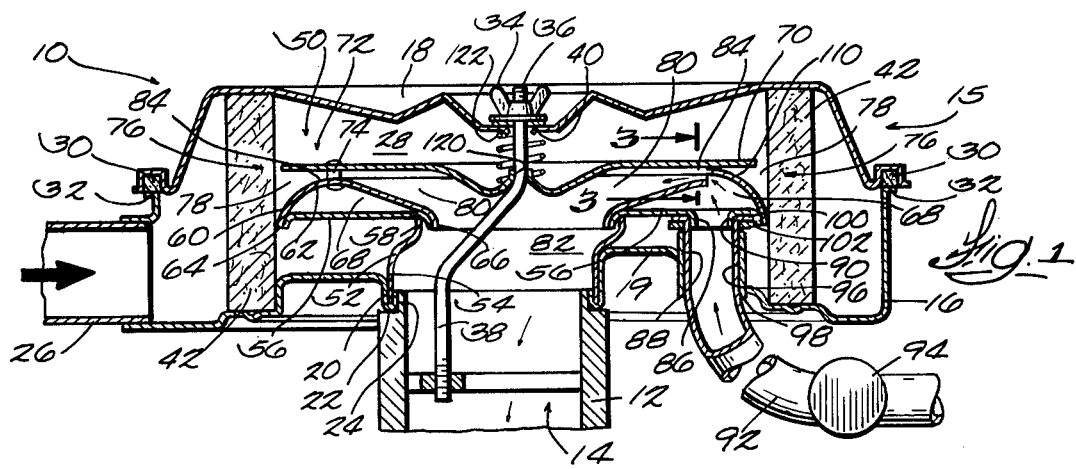
FIG. 1 is a cross sectional view of a proportioning device which embodies various of the features of the invention and which is shown mounted inside the housing of an existing air cleaner mounted on the air intake of an internal combustion engine carburetor.
Figure 2:
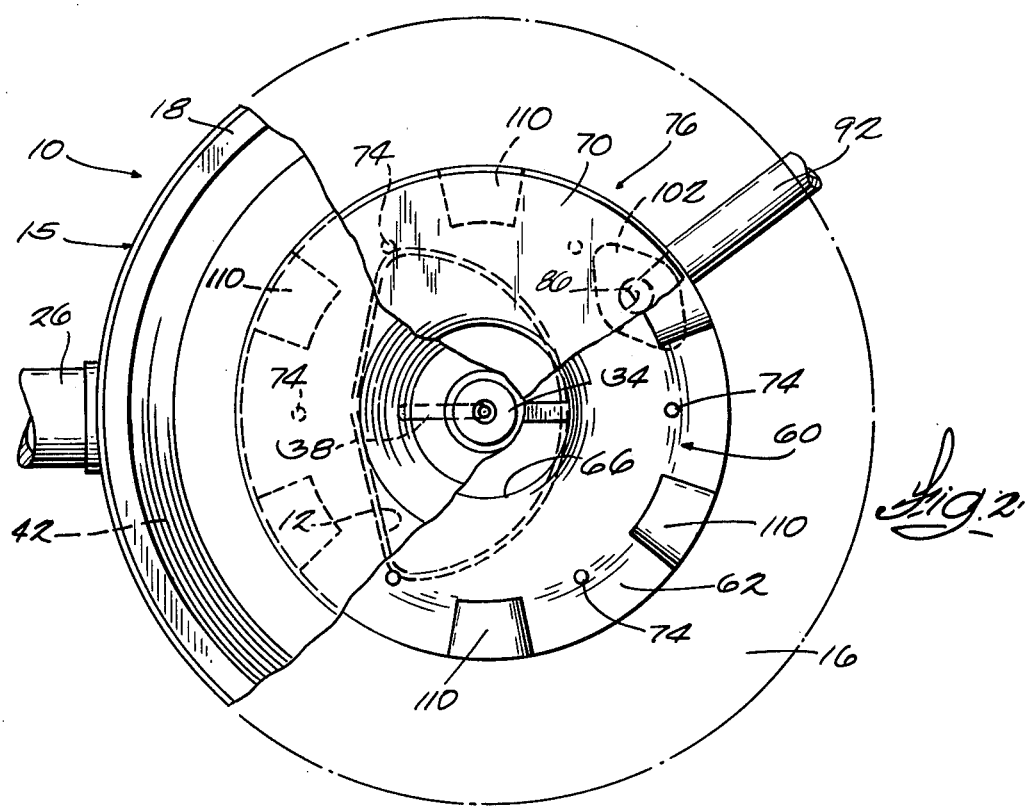
FIG. 2 is a top view of the air cleaner of FIG. 1, broken away to expose parts of the proportioning device.

Before explaining at least one of the embodiments of the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in the drawing is an air cleaner 10 mounted on the air intake 12 of a conventional carburetor 14 (illustrated fragmentarily) of a conventional internal combustion engine. Externally, the air cleaner 10 is of conventional construction and includes a housing 15 including a bowl-like bottom section 16 and a removable top section or cover 18. The bottom section 16 includes a bottom wall 19 and generally central sleeve portion 20 terminating in an upturned lip 22 which defines an aperture 24 for receiving the carburetor air intake 12. The air cleaner 10 includes an air inlet duct 26 through which atmospheric air is admitted into an interior chamber 28 defined by the bottom section 16 and the cover 18.

The cover 18 carries an annular seal or gasket 30 which seats on a peripheral flange 32 on the bottom section 16. The cover 18 is removably held in place by a wing nut 34 threaded onto the outer end 36 of an attachment rod 38 extending through a central aperture 40 in the cover 18. The other end of the attachment rod 38 is connected to the carburetor in the usual manner. Located inside the chamber 28 is a conventional filter element 42 through which the air flows enroute from the inlet duct 26 to the carburetor intake 12.

Disposed inside the chamber 28 is a proportioning device designated generally by reference numeral 50 for mixing air and a gaseous fuel, such as natural gas.

The proportioning device 50 includes an annular sleeve 52 having a lower end 54 which rests in the lip 22 on the lower section 16, an annular base member 56 connected to the upper end 58 of the sleeve 52, and an annular member 60 having an arcuate wall 62 and further having respective outer and inner peripheral edges 64 and 66 which are fastened to the base member 56 to define a substantially closed plenum chamber 68.

The proportioning device 50 also includes a plate- or disc-like member or top 70 having an annular peripheral edge portion 72 which is mounted on the annular member 60 in spaced relationship to the arcuate wall 62 via a plurality of circumferentially spaced spacers 74. The arcuate wall 62 is convex with respect to the peripheral edge portion 72 of the top 70 and cooperates therewith to form an annular venturi designated generally by reference number 76. The annular venturi 76 has an annular inlet 78 in communication with the atmosphere via the filter element 40 and the air inlet duct 26, an annular outlet 80 in communication with a mixing chamber 82 formed primarily by the top 70 and the sleeve 52, and an intermediate annular throat 84 in the area of minimum spacing between the arcuate wall 62 and the top 70. When the engine is operating on liquid fuel, such as gasoline, the flow area for air to the carburetor intake 12 is the total cross sectional area of the annular throat 84.

Means are provided for selectively admitting the gaseous fuel into the plenum chamber 68. While various means can be used, in the specific instruction illustrated, such means includes a circular opening 86 provided in the base member 56 and an opening 88 provided in the bottom wall 19 of the air cleaner section 16 coaxial with the base member opening 86. The base member opening 86 is formed by a nipple 90. One end of a pipe 92, made from a suitable material, is connected in communication with a source of natural gas (not shown) through a suitable shutoff valve 94 (illustrated schematically). The other end 96 of the pipe 92 extends through a flexible grommet 98 mounted in the opening 88 in the air cleaner bottom wall 19 and fits over the nipple 90 on the base member 56. The end 96 of the pipe 92 terminates in a flare 100 and is held in place by a clamp plate 102 which is suitably fastened to and clamps the hose flare 100 against the base member 56.

Figure 3:
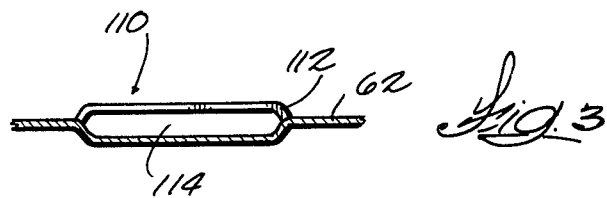
FIG. 3 is a sectional view taken generally along line 3—3 in FIG. 2.

Means are provided for inducing flow of the gaseous fuel from the plenum chamber 68 into the mixing chamber 82. While various suitable means can be used, in the specific embodiment illustrated, such means includes one or more offset portions 110 in the arcuate wall 62 at or in the vicinity of the annular venturi throat 84 and extending toward the top 70 to define an area of reduced cross sectional area. As best shown in FIG. 3, the offset portion 110 has an open edge 112 defining a transversely extending slot or outlet port 114 which has a narrow generally rectangular shape and faces toward the annular venturi outlet 80. In the specific embodiment illustrated, a plurality (e.g., 6) of offset portions 110 are formed in the arcuate wall 62 at substantially equal, circumferentially spaced intervals and the outlet ports 114 are located at the point of minimum spacing between the arcuate wall 62 and the top 70.

As air flows through the annular venturi 76 toward the mixing chamber 82, a reduced pressure condition is created in the vicinity of the annular venturi throat 84 where the highest velocity exists, thereby drawing the gaseous fuel from the plenum chamber 68 into the mixing chamber 82 when the engine is operating on a gaseous fuel.

Thus, while the relatively small offset portions 110 do not substantially decrease the total air flow area when the engine is operating on a liquid fuel, they do substantially increase the suction in the area immediately adjacent each outlet port 114 to more effectively draw the gaseous fuel into the mixing chamber 82 when the engine is operating on a gaseous fuel. Accordingly, there is no need to provide some mechanical means for increasing the flow area when operation of the engine is switched from a gaseous fuel to a liquid fuel as is the case with many prior constructions. Also, with the outlet ports 114 facing toward the annular venturi outlet 80, the gaseous fuel is drawn into the mixing chamber 82 at the annular venturi throat 84, and in the same direction as the air flow, thereby avoiding the possibility of diminishing the volume of entering air. The gaseous fuel and air mix prior to and during entry into the carburetor intake 12.

The top 70 of the proportioning device 50 includes a central aperture 120 through which the attachment rod 38 extends. A compression spring 122 disposed between the air cleaner cover 24 and the proportioning device top 70 maintains the lower end 54 of the sleeve 52 in firm engagement with the air cleaner lip 22.

By being arranged to fit inside the housing of an existing air cleaner, the proportioning device does not require any additional underhood space. Also, the existing manifold heating system does not have to be removed or modified, so the warm-up characteristics of the engine when operating on gasoline are not affected.

Various of the features of the invention are set forth in the following claims:

I claim:

1. A device for proportioning a gaseous fuel and air for combustion in an internal combustion engine, said device including a first member having a peripheral edge portion, a second member cooperating with said first member to define a mixing chamber having an outlet adapted to be connected in communication with the internal combustion engine, said second member including an annular portion having an arcuate first wall which is convex to and spaced from said peripheral edge portion of said first member to define therebetween an annular venturi having an annular inlet in communication with the atmosphere, an annular outlet in communication with said mixing chamber, and an annular throat of reduced cross sectional area intermediate said venturi inlet and outlet, said first wall also including an opening which is located at or in the vicinity of said annular venturi throat for inducing flow of gaseous fuel into said mixing chamber and which is formed by a first wall portion which is offset toward said first member to define an area of minimum spacing between said first wall and said first member and to define an outlet port which faces said annular venturi outlet, said second member further including a second wall cooperating with said first wall to define a substantially closed, annular plenum chamber, and means for selectively admitting a gaseous fuel into said plenum chamber.

2. A device according to claim 1 including a plurality of said openings which are circumferentially spaced at substantially equal intervals.

3. A device according to claim 1 wherein said outlet port has a transversely elongated, narrow rectangular shape.

4. A device for proportioning gaseous fuel and air for combustion in an internal combustion engine and adapted to fit inside an existing air cleaner including a housing having a hollow interior and a generally central opening adapted to receive the air intake of the engine carburetor, said device including a plate-like first member disposed in the hollow interior of the air cleaner housing and having a peripheral edge portion, a second member disposed in the hollow interior of the air cleaner housing and cooperating with said first member to define a mixing chamber having an outlet in communication with the carburetor air intake, said second member including an annular portion having an arcuate first wall which is convex to and spaced from said peripheral edge portion of said first member to define therebetween an annular venturi having an annular inlet in communication with the atmosphere, an annular outlet in communication with said mixing chamber and an annular throat of reduced cross section area intermediate said venturi inlet and outlet, said first wall also including an opening which is located at or in the vicinity of said annular venturi throat for inducing flow of gaseous fuel into said mixing chamber and which is formed by a first wall portion which is offset toward said first member to define an area of minimum spacing between said first wall and said first member and to define an outlet port which faces said annular venturi outlet, said second member further including a second wall cooperating with said first wall to define a substantially closed, annular plenum chamber, and means for selectively admitting a gaseous fuel into said plenum chamber.

* * * * *